US011487727B2

(12) United States Patent
Tian et al.

(10) Patent No.: US 11,487,727 B2
(45) Date of Patent: *Nov. 1, 2022

(54) RESOLVING VERSIONS IN AN APPEND-ONLY LARGE-SCALE DATA STORE IN DISTRIBUTED DATA MANAGEMENT SYSTEMS

(71) Applicant: International Business Machines Corporation, Armonk, NY (US)

(72) Inventors: Yuanyuan Tian, San Jose, CA (US); Vijayshankar Raman, Cupertino, CA (US); Ronald J. Barber, San Jose, CA (US); Richard S. Sidle, Ottowa (CA); Pinar Tozun, San Jose, CA (US); Rene Mueller, San Jose, CA (US); Ronen Grosman, Thornhill (CA); Adam J. Storm, Toronto (CA); Christian M. Garcia-Arellano, Richmond Hill (CA); Guy M. Lohman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,828

(22) Filed: Apr. 15, 2021

(65) Prior Publication Data

US 2021/0232554 A1     Jul. 29, 2021

Related U.S. Application Data

(63) Continuation of application No. 16/005,485, filed on Jun. 11, 2018, now Pat. No. 11,042,522.

(51) Int. Cl.
*G06F 16/20*     (2019.01)
*G06F 16/21*     (2019.01)
(Continued)

(52) U.S. Cl.
CPC .......... *G06F 16/219* (2019.01); *G06F 16/221* (2019.01); *G06F 16/2237* (2019.01);
(Continued)

(58) Field of Classification Search
CPC .. G06F 16/219; G06F 16/221; G06F 16/2237; G06F 16/2329; G06F 16/2365; G06F 16/254
See application file for complete search history.

(56) References Cited

U.S. PATENT DOCUMENTS 8,200,614 B2    6/2012   Syed
9,201,738 B2    2/2015   Volk
(Continued)

FOREIGN PATENT DOCUMENTS

CN     101382949 B     9/2011
CN     103548010 B     3/2017
(Continued)

OTHER PUBLICATIONS

Dinh, A., et al., "UStore: A Distributed StorageWith Rich Semantics," ArXiv, Feb. 9, 2017, pp. 1-21, arXiv:1702.02799 [cs.DB], downloaded at https://arxiv.org/pdf/1702.02799.pdf, Cornell University Library, United States.
(Continued)

*Primary Examiner* — Kristopher Andersen
(74) *Attorney, Agent, or Firm* — Sherman IP LLP; Kenneth L. Sherman; Steven Laut

(57) ABSTRACT

One embodiment provides for a method including performing, by a processing thread, a process that analyzes transactional operations by maintaining the transactional operations in transaction local side logs, and waiting until a successful transaction commit to append the transaction local side logs to a log stream. The processing thread processes the transactional operations on a key used to
(Continued)

determine whether existing data is found for the key. The transactional operations are sped up through parallelism based on partitioning tables across nodes handling the transactional operations. A first process is performed by a first processor that processes updates for values of a key based on updating a first start time table index using unique keys and a start time field of a row for a first appearance of each unique key from the transactional operations.

20 Claims, 10 Drawing Sheets

(51) Int. Cl.
  *G06F 16/22* (2019.01)
  *G06F 16/25* (2019.01)
  *G06F 16/23* (2019.01)
(52) U.S. Cl.
  CPC ...... *G06F 16/2329* (2019.01); *G06F 16/2365* (2019.01); *G06F 16/254* (2019.01)

(56) References Cited

U.S. PATENT DOCUMENTS

| | | |
|---|---|---|
| 9,483,256 B2 | 11/2016 | Brar |
| 9,736,243 B2 | 8/2017 | Chablani |
| 2006/0112152 A1 | 5/2006 | Napier |
| 2013/0226931 A1 | 8/2013 | Hazel |
| 2013/0325808 A1 | 12/2013 | Bachar |
| 2014/0351202 A1 | 11/2014 | McCline |
| 2016/0283528 A1* | 9/2016 | Benke ............... G06F 16/2379 |
| 2016/0371357 A1 | 12/2016 | Park |
| 2017/0154075 A1 | 6/2017 | Anderson |
| 2017/0180394 A1 | 6/2017 | Crofton |
| 2017/0317874 A1 | 11/2017 | Borah |
| 2018/0232412 A1 | 8/2018 | Bensberg |

FOREIGN PATENT DOCUMENTS

| | | |
|---|---|---|
| CN | 107148617 A | 9/2017 |
| WO | 2007146941 A2 | 12/2007 |
| WO | 2012162176 A2 | 11/2012 |
| WO | 2018001200 A1 | 1/2018 |

OTHER PUBLICATIONS

Gramoli, V., et al., "Rollup: Non-Disruptive Rolling Upgrade with Fast Consensus-Based Dynamic Reconfigurations," IEEE Transactions on Parallel and Distributed Systems, Sep. 2016, pp. 2711-2724, v. 27, n. 9, IEEE, United States.

International Search Report and Written Opinion dated Aug. 20, 2019 for International Application PCT/IB2019/051521 from National Intellectual Property Administration, pp. 1-9, Beijing China.

List of IBM Patents or Patent Applications Treated as Related; Tian, Y. et al., U.S. Appl. No. 16/005,485, filed Jun. 11, 2018.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

RESOLVING VERSIONS IN AN APPEND-ONLY LARGE-SCALE DATA STORE IN DISTRIBUTED DATA MANAGEMENT SYSTEMS

BACKGROUND

Conventional data management systems that target high-availability have to allow transactional operations, such as updates, deletes, and inserts (UDIs) to go to any replica of data. The transactional operations also target compatibility with the big data ecosystem, which uses append-only (and hence mutation unfriendly) storage streams because of their superiority in efficient read and write operations and space consumption. Updates are traditionally a problem for versioned databases. Consider an update to a record inserted five years back. The original version of that record is likely migrated to a read-friendly storage system (such as an object store), which is not efficient at random access, and may not support any in-place updates.

SUMMARY

Embodiments relate to processing updates for key values and speed up of processing for patch up of prior versions of updates and not yet patched updates. One embodiment provides for a method including performing, by a processing thread, a process that analyzes transactional operations by maintaining the transactional operations in transaction local side logs, and waiting until a successful transaction commit to append the transaction local side logs to a log stream. The processing thread processes the transactional operations on a key used to determine whether existing data is found for the key. The transactional operations are sped up through parallelism based on partitioning tables across nodes handling the transactional operations. A first process is performed by a first processor that processes updates for values of a key based on updating a first start time table index using unique keys and a start time field of a row for a first appearance of each unique key from the transactional operations.

These and other features, aspects and advantages of the present invention will become understood with reference to the following description, appended claims and accompanying figures.

DETAILED DESCRIPTION

Figure 1:
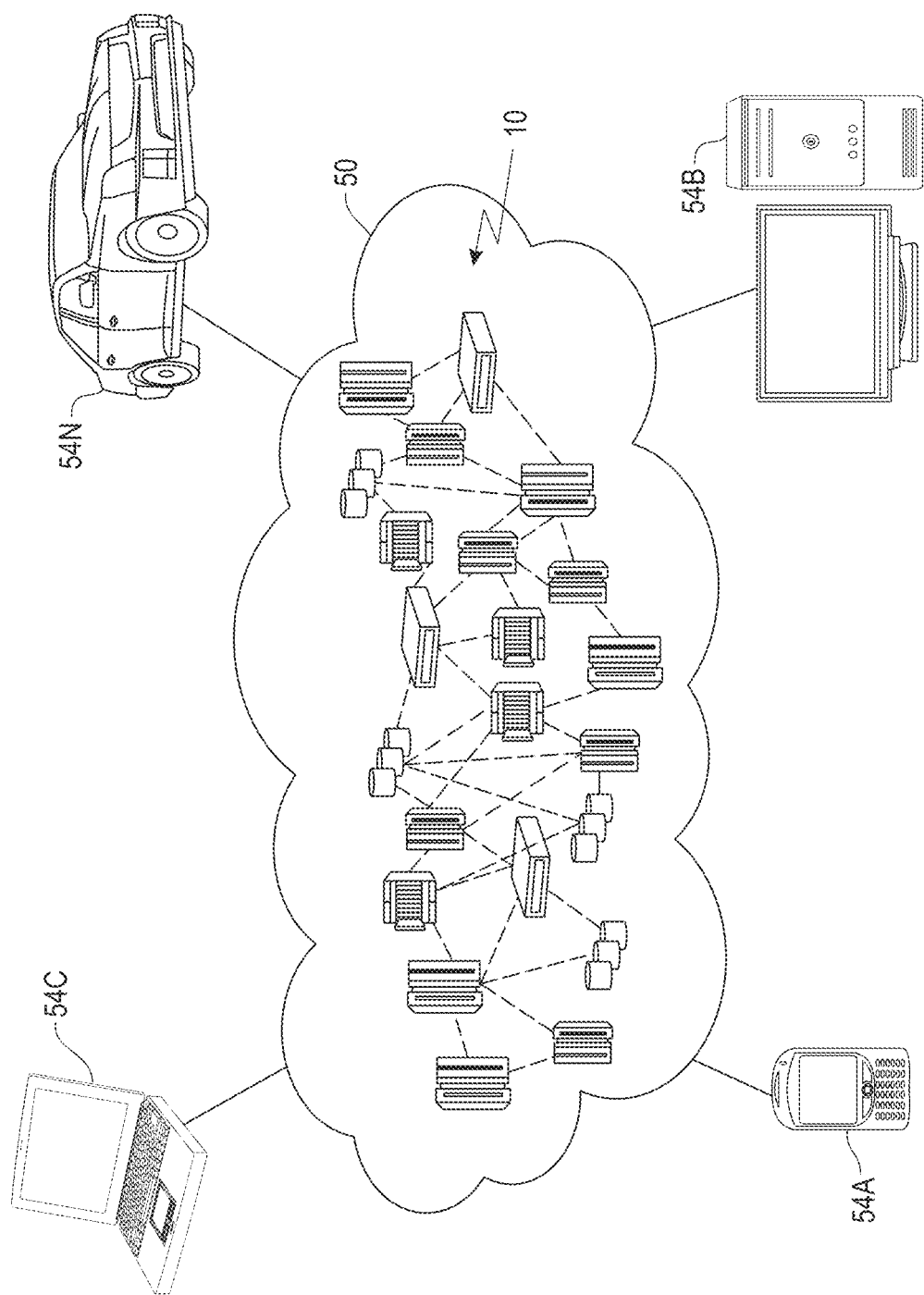
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to transactional operations (e.g., updates, deletes, inserts, etc.) in multi-master distributed data management systems. One embodiment provides a method including processing transactional operations on a key used to determine whether existing data is found for that key. A first time index is updated using unique keys and a start time field of a first appearance of each key from the transactional operations. A deferred update of prior versions of the key is performed for non-recent data upon determining that recent data in the transactional operations is found for the key.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
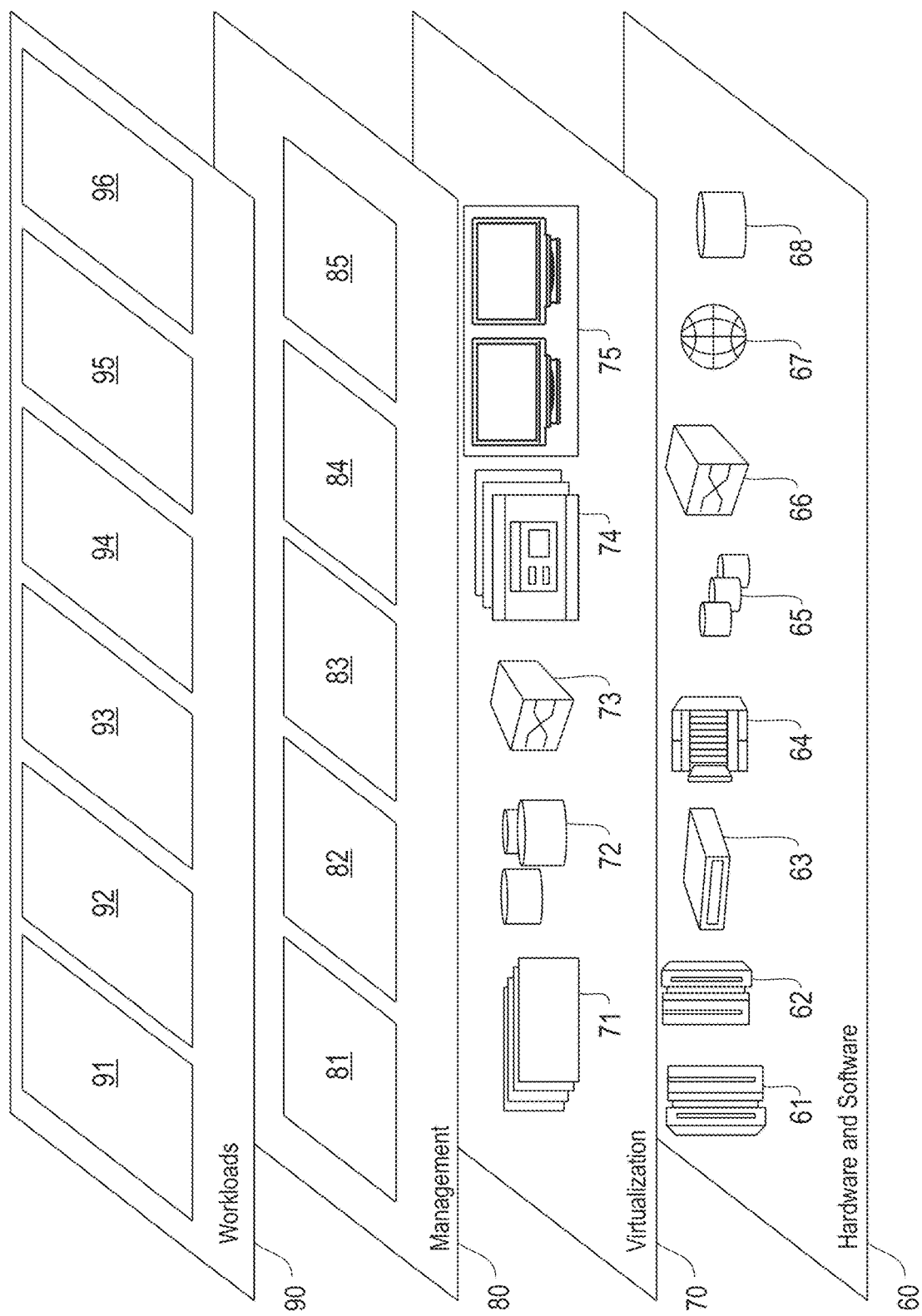
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updates for key values and for patch up of prior versions of updates and not yet patched updates processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
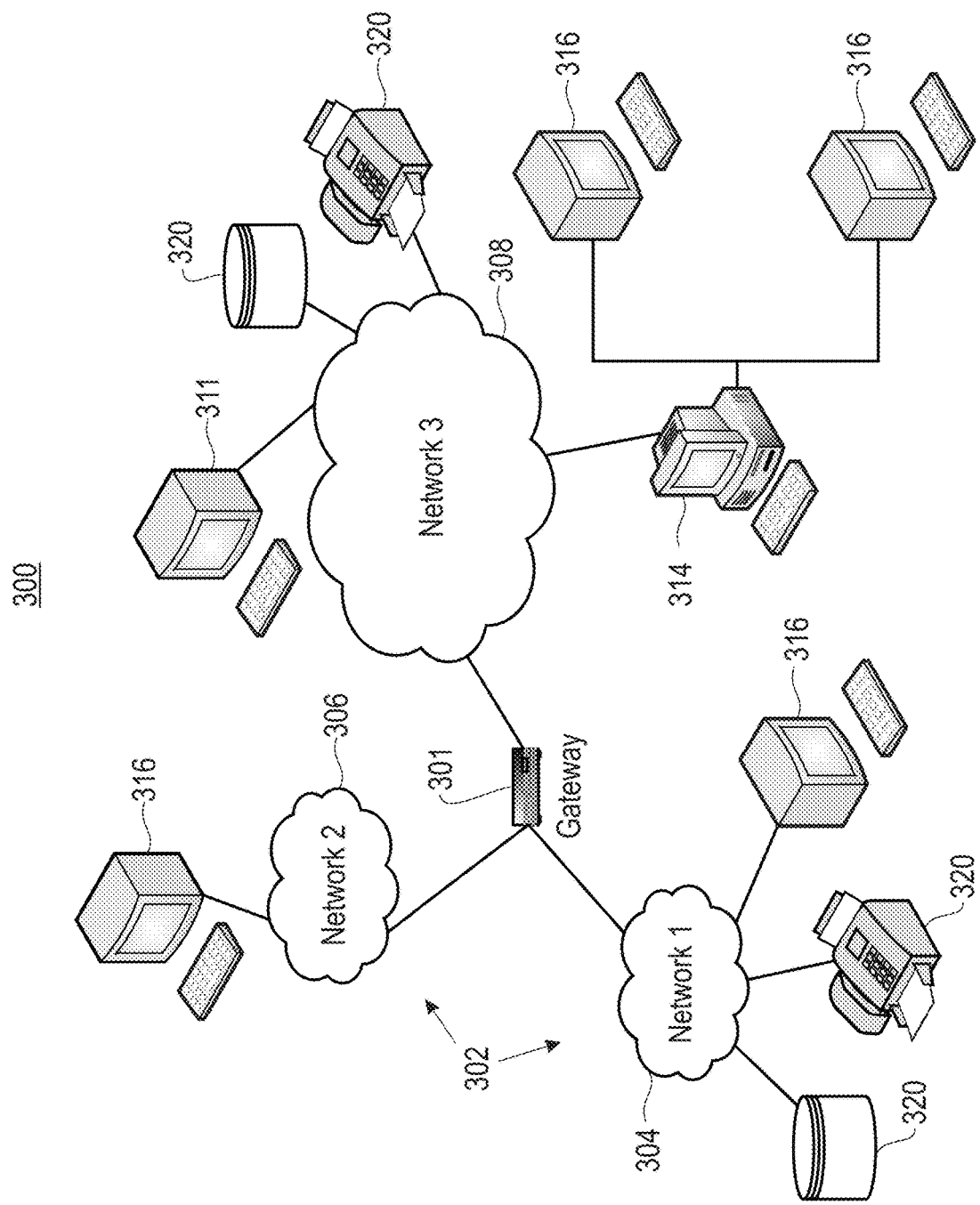
FIG. 3 is a network architecture for a multi-master distributed data management system, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
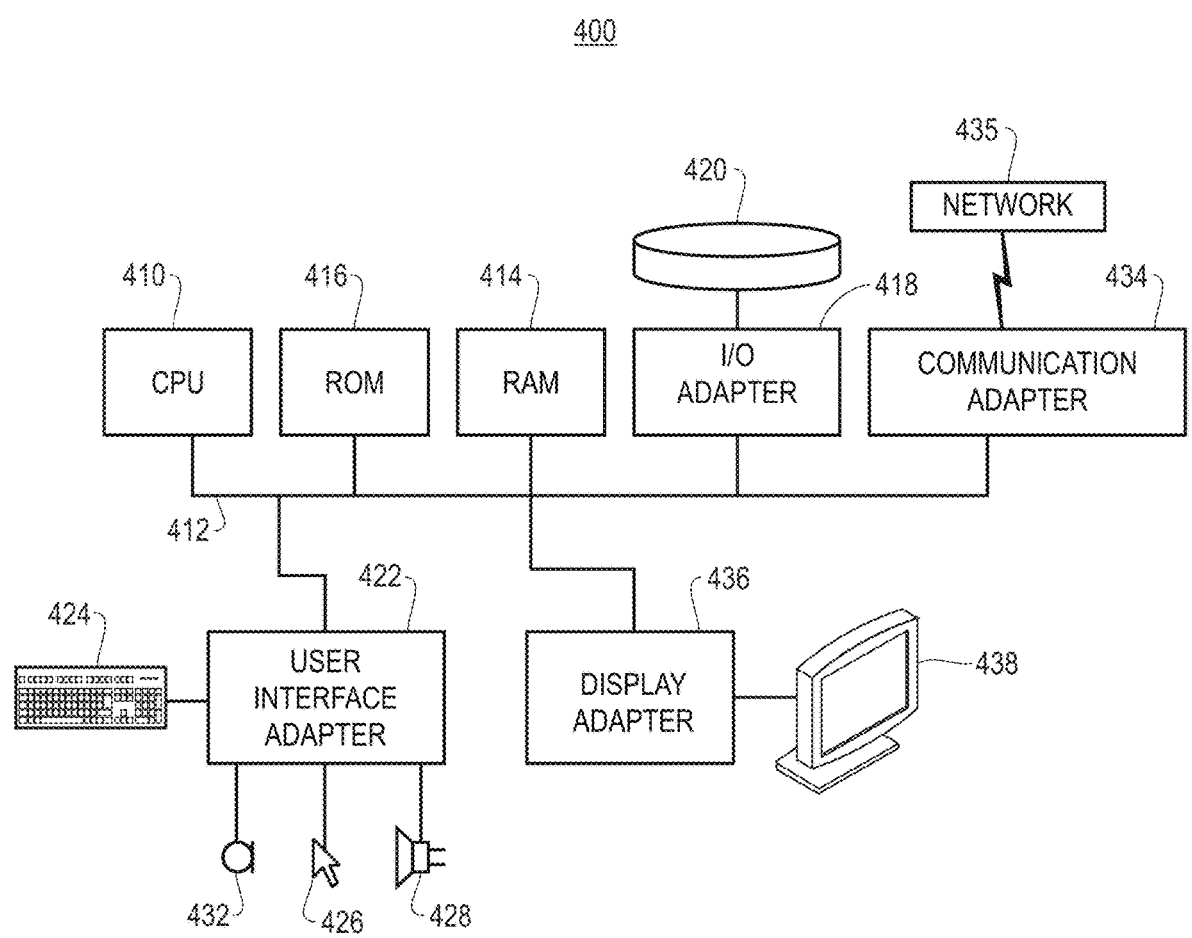
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
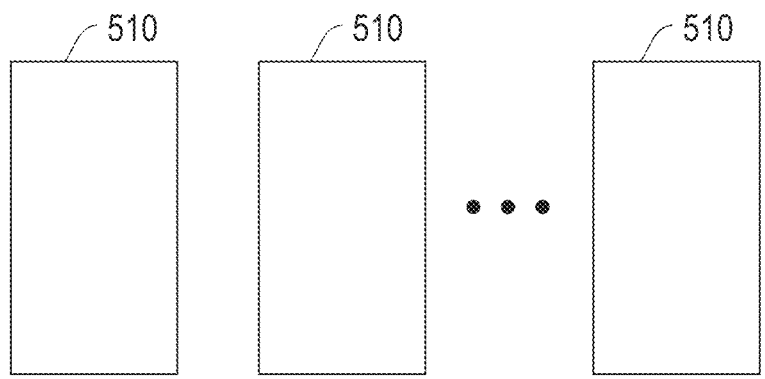
FIG. 5 is a block diagram illustrating a multi-master distributed data management system for performing processing updates for key values and for patch up of prior versions of updates and not yet patched updates, according to one embodiment.
Figure 5:
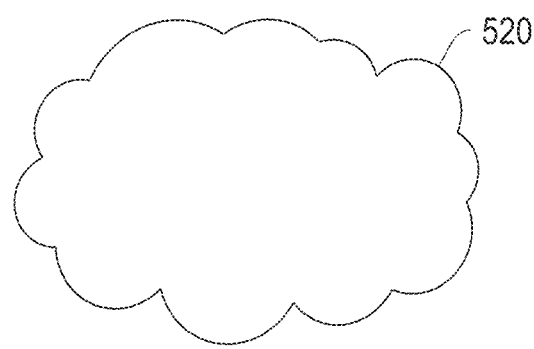
Figure 5:
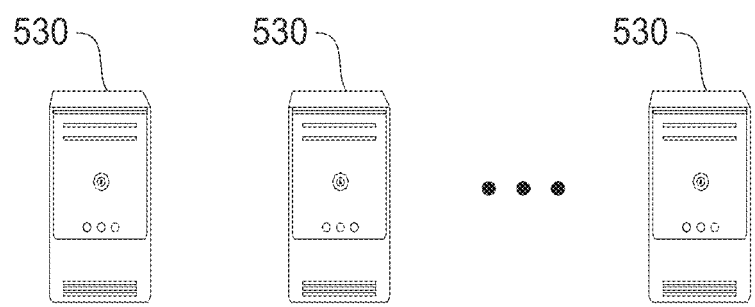

FIG. 5 is a block diagram illustrating a system 500 that may be employed for performing processing updates for key values and for patch up of prior versions of updates and not yet patched updates, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500, a periodic background process referred to as grooming, analyzes transactional operations (e.g., updates, deletes, inserts (UDIs)) from multi-statement transactions executed on a multi-master system, and publishes the UDIs on an append-only storage stream. In one embodiment, for the grooming process the multi-master system maintains/keeps the UDIs of ongoing multi-statement transactions in a transaction-local side-log. Only upon a successful transaction commit, the transaction-local side-logs are appended to the log stream. The grooming process only reads the log stream, therefore, the grooming process avoids being aware of uncommitted transaction changes. The thread performing the grooming process (also referred to as "groomer") provides a cursor or indication on the log stream to remember where it left off in the previous grooming cycle. The log stream that is prior to where the groomer's cursor or indication points to is marked for deletion.

In one embodiment, rollup processing periodically moves groomed data from a groomed zone (e.g., groomed zone 711, FIGS. 7, 9) to an optimized zone (optimized zone 901, FIG. 9) separating groomed blocks 855 (FIGS. 8, 9) current from history. Small groomed blocks are merged into large blocks 855. Data is partitioned based on the partition key. Rollup processing supports updates (mark and move previous value of a key into history), and time travel (allows querying old values of a key). In one embodiment, the rollup processing handles conflict resolution (concurrent updates to the same data item) in a data store (e.g., a database or a key-value store) setting.

In one embodiment, versions in an append-only large-scale data store are efficiently resolved based on a first procedure including an update processor that processes updates for the values of a key, and a second procedure including a rollup processor that patches up prior versions. Inserts for new keys are handled as updates that specify values for the first version of that key. Deletes of keys are handled as updates that change the value of a key to an indicator indicating that it is deleted.

Figure 6:
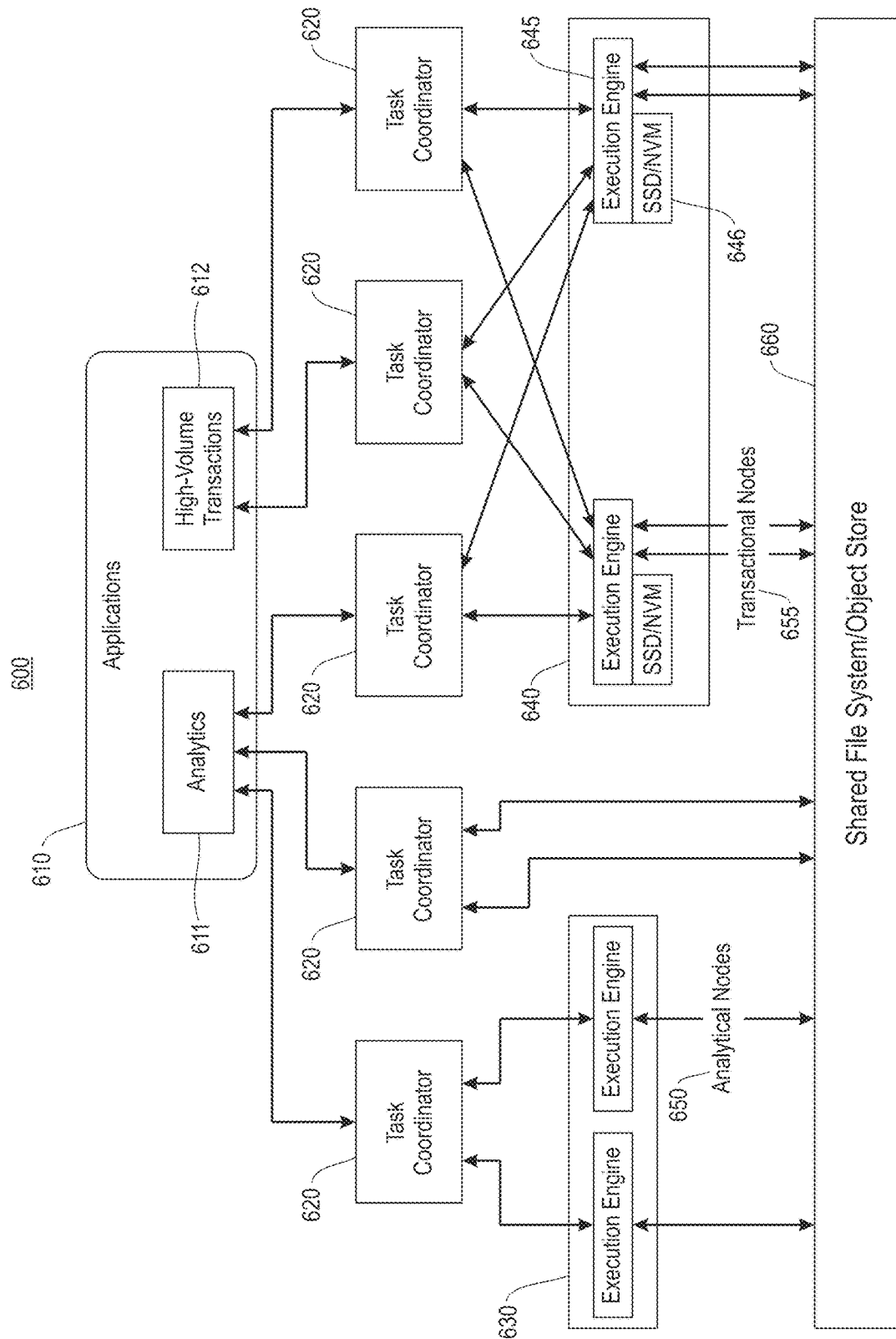
FIG. 6 illustrates an example architecture for performing a grooming process in a multi-master distributed data management system, according to one embodiment.

FIG. 6 illustrates an example architecture 600 for performing grooming processes and rollup processes in a multi-master distributed data management system, according to one embodiment. In one embodiment, the architecture 600 includes applications 610, task coordinators 620, execution engines 630, for analytical nodes 650, execution engines 640 for transactional nodes 655 and storage 660. In one embodiment, the applications 610 may include analytics applications 611 that tolerate slightly stale data and requires most recent data, and high volume transaction applications 612. In one embodiment, the analytical nodes 650 only handle read-only operations. The transactional nodes 655 are responsible for grooming transaction operations (e.g., UDIs) and performing rollup processes. The execution engines 640 include multiple execution engines 645 connected with memory devices 646 (e.g., solid state drive(s) (SSD)) and non-volatile memory (NVM), such as read-only memory, flash memory, ferroelectric RAM, magnetic computer storage devices (e.g., hard disk drives, floppy disks, and magnetic tape, optical discs, etc.). The storage 660 may include a shared file system, object store, or both.

In one embodiment, to speed up UDI operations through parallelism, the tables in the multi-master system that includes the architecture 600 are partitioned across nodes handling transactions based upon a subset of a primary (single-column or composite) key. A table shard is also assigned to (a configurable number of) multiple nodes (transactional nodes 655) for higher availability. In addition to the transactional nodes 655 that are responsible from UDI operations and lookups on data, the analytical nodes 650 are only responsible for analytical read requests. A distributed coordination system includes the task coordinators 620 that manage the meta-information related to replication, and a catalog maintains the schema information for each table. One or more embodiments also allow external readers to read data ingested via the multi-master system without involving the local system components, but those readers will be unable to see the latest transactional data stored on the transactional nodes 655 handling UDI operations.

In one embodiment, each transaction handled by the architecture 600 maintains its un-committed changes in a transaction-local side-log 811 (FIG. 8) composed of one or more log blocks. Each log block may contain transactions for only one table. At commit time, the transaction appends its transaction-local side-log 811 to the log 812 (FIG. 8), which is kept both in storage 660 (memory 810, FIG. 8) and persisted on disk (SSD/NVM 646 (830, FIG. 8)). Additionally, the transaction-local side-log 811 is copied to each of the other transactional nodes 655 that are responsible for maintaining a replica of that shard's data, for availability. While any replica of a shard may process any transactional request for that shard (multi-master), one of the replicas periodically invokes a grooming operation or process. This grooming operation scans the log 812 and groups together the log blocks from multiple (committed) transactions for the same table, creating larger groomed blocks containing data only from a single table (see, e.g., FIG. 8, groomed data 855).

Figure 7:
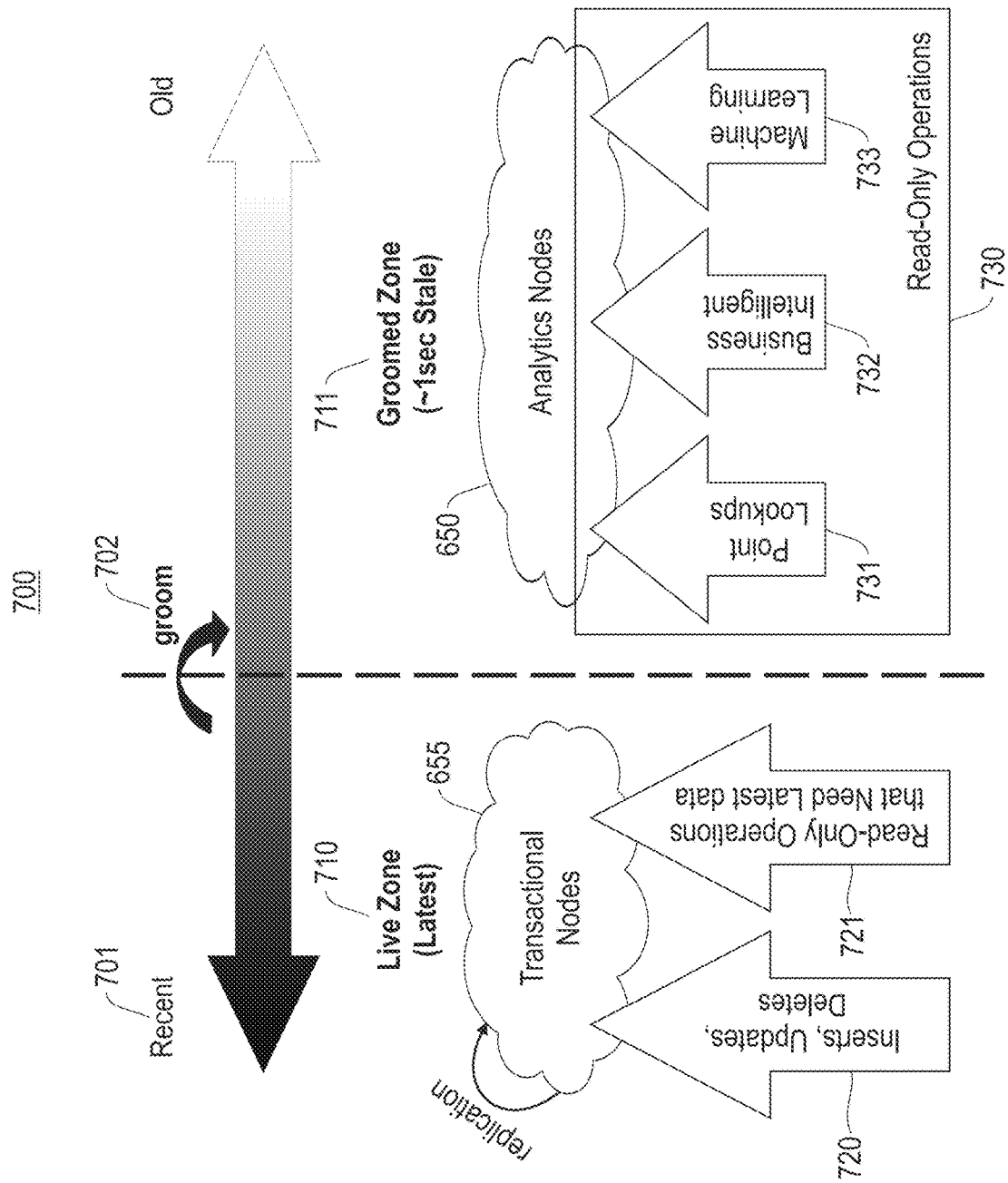
FIG. 7 illustrates a life cycle example for data in a multi-master distributed data management system, according to one embodiment.

FIG. 7 illustrates a life cycle example 700 for data in a multi-master distributed data management system including architecture 600 (FIG. 6), according to one embodiment. In one embodiment, the life of data is represented by recent data 701 and old data 702. The recent data 701 belongs to the live zone (latest) 710 whereas the old data belongs to the groomed zone 711 (e.g., ~1 second stale). The transactional nodes 655 belong to the live zone 710, and receive inserts, updates and delete transactional operations 720 and read-only operations 721 that need the latest data. The analytical nodes 650 belong to the groomed zone 711 and receive input 730 including: point lookups 731, business intelligent operations 732, and machine learning (read-only) operations 733. As illustrated, the data in the live zone 710 moves over to the groomed zone 711 as it becomes older data.

Figure 8:
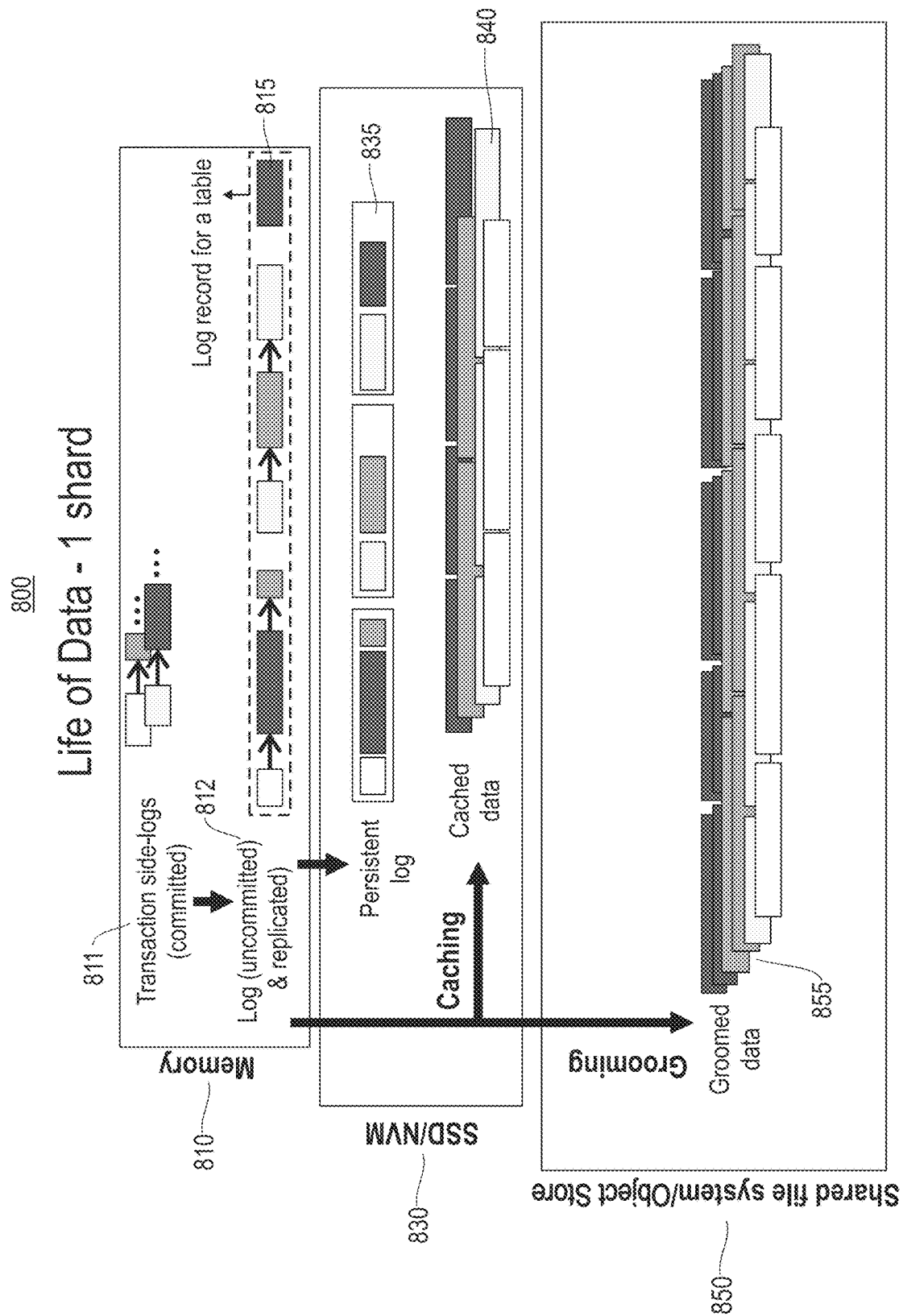
FIG. 8 illustrates an example of grooming data in a multi-master distributed data management system, according to one embodiment.

FIG. 8 illustrates an example 800 of grooming data in a multi-master distributed data management system, according to one embodiment. As illustrated, the un-committed changes are recorded/stored in a transaction-local side-log 811 composed of one or more log blocks. The log record 815 of a table includes the log blocks for the log (persistent) 812. The transaction appends its transaction-local side-log 811 to the log 812, which is kept both in memory 810 and persisted on disk SSD/NVM 830. In the SSD/NVM 830, the log 812 is processed in records 835 and cached as cached data 840. The groomed data 855 that results from the grooming process is stored in the shared file system/object store 850 (or storage 660, FIG. 6).

Figure 9:
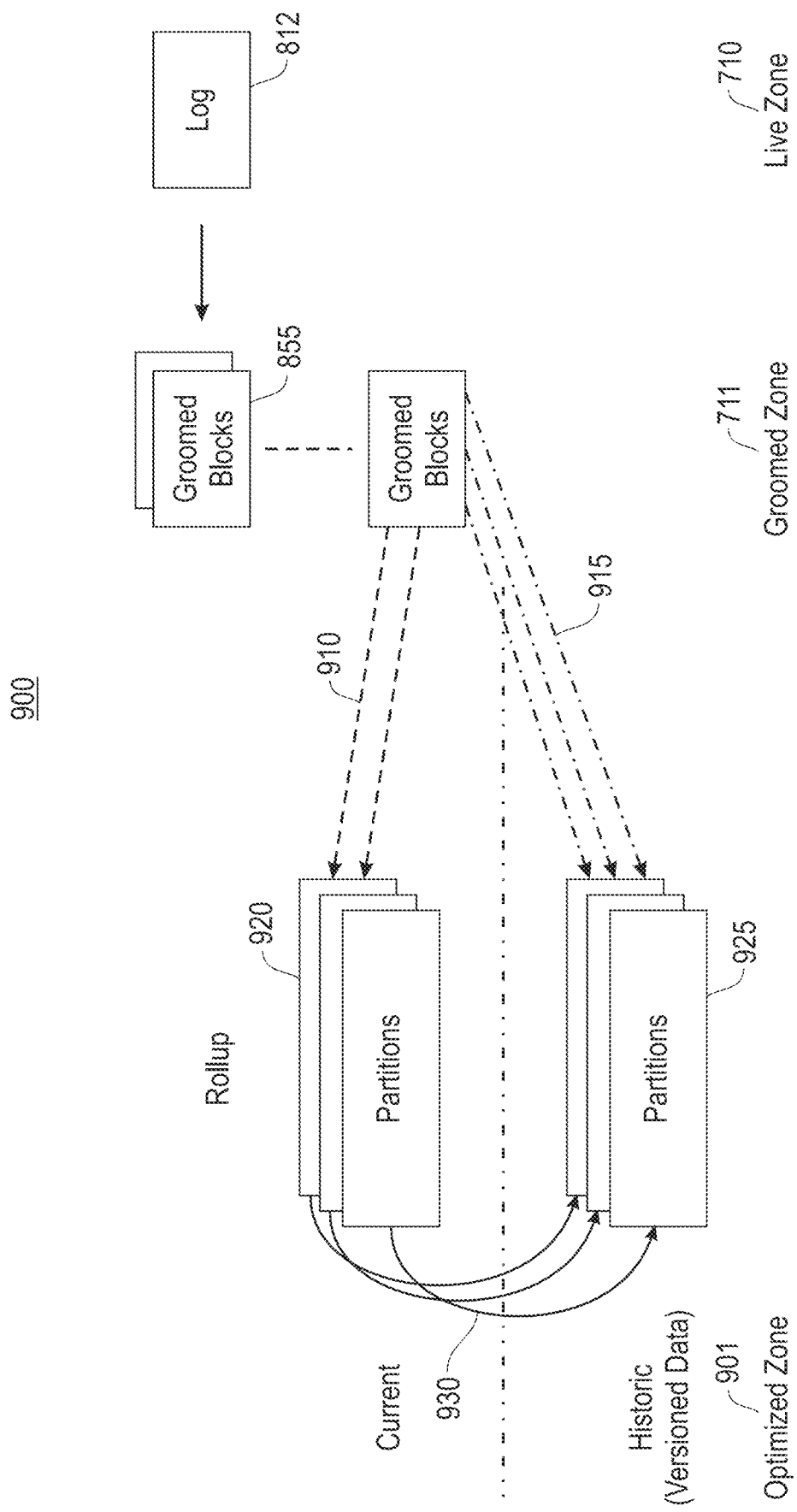
FIG. 9 illustrates an example block diagram for a rollup process for processing updates for key values and for patch up of prior versions of updates and not yet patched updates, according to one embodiment.

FIG. 9 illustrates an example block diagram 900 for a rollup process, according to one embodiment. In the high-level example block diagram 900, the process includes input of groomed blocks 855 from the persistent log 812, which are moved from the groomed zone 711 to the optimized zone 901 as follows. The groomer does not handle updates, therefore, the same key may appear multiple times in the groomed data of the groomed blocks 855. Herein, the latest row is the latest row for a key, and a retired row is a row that is not the latest row for a key.

In one embodiment, the first portion of the process is moving the groomed blocks 855 to the optimized zone 901 where the latest rows in groomed zone 711 are moved to the current portion of the optimized zone 901 shown by the dashed lines 910 going to the partitions 920. The retired rows in the groomed zone 711 are moved to the historic portion of the optimized zone 901 shown by the dashed lines 915 going to the partitions 925. For the second portion of the process, the current=>History within optimized zone 901 as follows. The processing marks the retired rows in the previous current by using a bit map. The retired rows in the previous current (retired by latest groomed rows) are moved to the history portion shown by the arrows 930. Further details of the first portion and the second portion of processing are described below.

In one embodiment, processing detects the recently groomed files. The detected groomed data (groomed blocks 855) are moved into the optimized zone 901 as described below. The output of this portion of processing are: an index referred to as FirstKnownStartTimeIndex, which maps a key to a beginTime field of a row for the first appearance of the key; a current file per partition key; and a history file per partition key. Next, all the affected current files are found by querying an index with the keys in the FirstKnownStartTimeIndex. The affected files contain at least one row that is retired by the new groomed rows. Next, processing retires rows from affected current files and outputs a history file per partition key and a new bit map for each affected file which marks down the retired rows.

In one embodiment, the first processing portion of moving the groomed blocks 855 data into the optimized zone 901 includes the following. The processing initializes a global in-memory index, referred to as FirstKnownStartTimeIndex. The detected groomed files are scanned in parallel and all rows are grouped by a partition key. For each partition key group: a current file and a history file are created for this partition key. All rows in this group are grouped by primary key. For each primary key group: processing sorts rows by value in a BeginTime field of a row; put (key, BeginTime) of the first row into the FirstKnownStartTimeIndex; For all rows but the last: processing assigns EndTime: $row_i.EndTime=row_{i+1}.BeginTime$, and this row is written to the history file; Write the last row to the current file; the current file and the history file are closed. The bit map index of the current file is initialized (e.g., so that it contains all 1's).

In one embodiment, the second processing portion of retiring rows from current files includes the following. The affected current files are grouped based on the partition key and the groups are then scanned in parallel. For each partition key group: processing creates a history file for this partition key. For each current file in this group: processing creates a new bit map index by copying the previous version of the bit map index. Processing then loops through each row and performs processing including: if the key of the row is in the FirstKnownStartTimeIndex (this row is retired) then assign the EndTime row field as follows: row.EndTime=FirstKnownStartTime(key).BeginTime. The row is then written to the history file. Processing marks the bit map index to indicate that this row is retired. Then the bit map index and the history file are each closed.

In one embodiment, fault tolerance of rollup is achieved through checkpointing. When a rollup process fails, a new rollup process may be brought up to resume from a last successful checkpoint. The last successful rollup sequence number is stored in a fault tolerant coordinator such as Apache Zookeeper. The last groomed block 855 ID for this rollup round is needed by the processing engine, but not used for fault tolerance. A checkpoint file with each rollup sequence number is stored on the object store and includes the following: the range of groomed block Ids, the last current block ID, the last history block ID, and a snapshot of the list of current files with their latest bit maps.

In one embodiment, snapshot files for queries includes the following. Rollup happens concurrently with queries. There is a need to ensure the consistency of the query results. After each successful rollup, a snapshot file is published that contains the list of current files with their latest bit maps, and a new query is against the files in the snapshot of the latest successful rollup.

Figure 10:
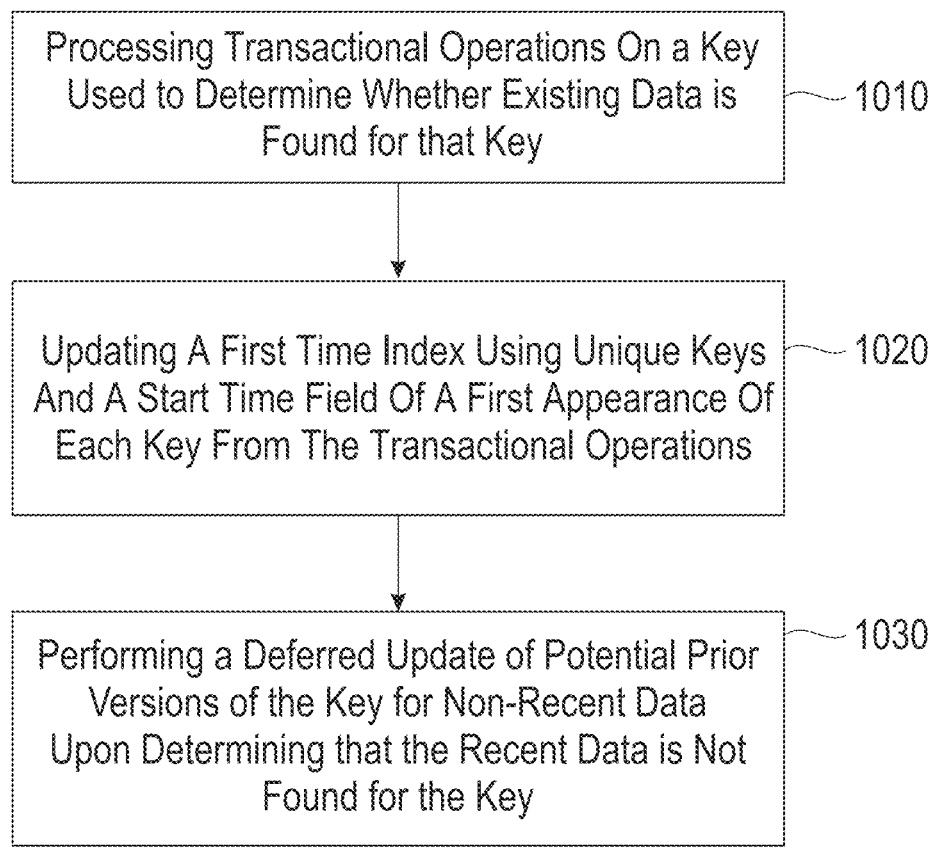
FIG. 10 illustrates a block diagram for a process for performing processing updates for key values and for patch up of prior versions of updates and not yet patched updates, according to one embodiment.

FIG. 10 illustrates a block diagram for process 1000 for performing processing updates for key values and for patch up of prior versions of updates and not yet patched updates in a system, such as multi-master distributed data management system, append-only system, etc., according to one embodiment. In one embodiment, in block 1010 process 1000 performs processing of transactional operations on a key used to determine whether existing data is found for that key. In block 1020, process 1000 updates a FirstKnownStartTimeIndex (or first time index) using the unique keys and the BeginTime (or a start time) field of the first appearance of each key from the transactional operations. In block 1030, process 1000 performs a deferred update of prior versions of the key for non-recent data upon determining that recent data in the transactional operations is found for the key. In one embodiment, the transactional operations comprise update, delete and insert operations.

In one embodiment, process 1000 may include that performing the deferred update includes adding a FirstKnownStartTimeIndex using the unique keys and the BeginTime field of the first appearance of each key from the transactional operations, and performing look ups of the FirstKnownStartTimeIndex for unknown value of the EndTime field of the rows in non-recent data. In one embodiment, the EndTime field of a row in the non-recent data is not assigned upon determining the key is not in the FirstKnownStartTimeIndex.

In one embodiment, in process 1000 the EndTime (or end time) field of a row in the non-rencent data is not assigned upon determining the key is not in the FirstKnownStartTimeIndex, and bitmap indexes are used to mark deleted rows. Process 1000 may further include that the FirstKnownStartTimeIndex maps a key to a BeginTime field of a row for a first appearance of the key.

In one embodiment, process 1000 may further include retiring rows from affected current files, outputting a history file per partition key, and generating a new bit map for each affected file, wherein the new bit map includes marking for the retired rows.

In one embodiment, process 1000 may additionally include initializing, the FirstKnownStartTimeIndex, creating a current file and a history file for each partition key group for a partition key, grouping all rows in a partition key group by primary key, for each primary key group: sorting rows by value in a BeginTime field of a row; writing of a first row into the FirstKnownStartTimeIndex; and for all rows except for a last row writing values to a history file. In one embodiment end time is assigned as $row_i.EndTime=row_{i+1}.BeginTime$, where i is an integer indicating the position of the row in the sorted order of the primary key group, and the last row is written to the current file.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
performing, by a processing thread, a process that analyzes transactional operations by maintaining the transactional operations in transaction local side logs, and waiting until a successful transaction commit to append the transaction local side logs to a log stream, the processing thread processes the transactional operations on a key used to determine whether existing data is found for the key, wherein the transactional operations are sped up through parallelism based on partitioning tables across nodes handling the transactional operations;
performing a first process, by a first processor, that processes updates for values of a key based on updating a first start time table index using unique keys and a start time field of a row for a first appearance of each unique key from the transactional operations; and
performing a second process, by a second processor, that performs a deferred update by patching up of prior versions of the key for non-recent data upon determining that recent data in the transactional operations is found for the key,
wherein the nodes handling the transactional operations are based upon a subset of a primary key.

2. The method of claim 1,
wherein the transactional operations are performed in a multi-master distributed computing system.

3. The method of claim 2, wherein the process avoids information for uncommitted transaction changes, and the process that analyzes transactional operations is a grooming process.

4. The method of claim 3, wherein the transactional operations comprise update, delete and insert operations, insert operations for new keys are handled as updates that specify values for a first version of a new key, delete operations are handled as updates that change a value of the key to an indicator that indicates deletion, the first start time index is a global in-memory index, and a table shard is assigned to the nodes handling the transactional operations.

5. The method of claim 4, wherein performing the deferred update comprises:
adding the first start time index using the unique keys and the start time field of the first appearance of each unique key from the transactional operations; and
looking up the first start time index for an unknown value of an end time field of rows in the non-recent data.

6. The method of claim 5, wherein the end time field of a row in the non-recent data is not assigned upon determining the key is not in the first start time index, the grooming process is limited to reading the log stream for avoiding information for the uncommitted transaction changes, and the end time field of a row in the non-recent data is not assigned upon determining the key is not in the first start time index, and bitmap indexes are used to mark deleted rows.

7. The method of claim 6, wherein the first start time index maps the key to the start time field of a row for the first appearance of the key.

8. The method of claim 6, further comprising:
retiring rows from affected current files;
outputting a history file per partition key;
generating a new bit map for each affected current file, wherein the new bit map includes marking for the retired rows;
initializing, a first known start time index;
creating a current file and a history file for each partition key group for a partition key;
grouping all rows in a partition key group by primary key;
for each primary key group:
sorting rows by value in a begin time field of a row;
writing of a first row into the first known start time index;
for all rows except for a last row:
writing values to a history file, wherein end time is assigned as $row_i.EndTime=row_{i+1}.BeginTime$, where i is an integer indicating position of a row in a sorted order of a primary key group; and
writing the last row to the current file.

9. A computer program product for processing updates for key values and for patch up of prior versions of updates and not yet patched updates, the computer program product comprising a non-transitory computer readable storage medium having program instructions embodied therewith, the program instructions executable by a processor to cause the processor to:
perform, by the processor, a process that analyzes transactional operations by maintaining the transactional operations in transaction local side logs, and waiting until a successful transaction commit to append the transaction local side logs to a log stream, the processing thread processes the transactional operations on a key used to determine whether existing data is found for the key, wherein the transactional operations are sped up through parallelism based on partitioning tables across nodes handling the transactional operations;
perform a first process, by the processor, that processes updates for values of a key based on updating a first start time table index using unique keys and a start time field of a row for a first appearance of each unique key from the transactional operations; and
perform a second process, by the processor, that performs a deferred update by patching up of prior versions of the key for non-recent data upon determining that recent data in the transactional operations is found for the key,
wherein the nodes handling the transactional operations are based upon a subset of a primary key.

10. The computer program product of claim 9,
wherein the transactional operations are performed in a multi-master distributed computing system.

11. The computer program product of claim 10, wherein the process avoids information for uncommitted transaction changes, and the process that analyzes transactional operations is a grooming process.

12. The computer program product of claim 11, wherein the transactional operations comprise update, delete and insert operations, insert operations for new keys are handled as updates that specify values for a first version of a new key, delete operations are handled as updates that change a value of the key to an indicator that indicates deletion, the first start time index is a global in-memory index, and a table shard is assigned to the nodes handling the transactional operations.

13. The computer program product of claim 12, wherein performing the deferred update comprises:
  adding the first start time index using the unique keys and the start time field of the first appearance of each unique key from the transactional operations; and
  looking up the first start time index for an unknown value of an end time field of rows in the non-recent data.

14. The computer program product of claim 13, wherein the end time field of a row in the non-recent data is not assigned upon determining the key is not in the first start time index, the grooming process is limited to reading the log stream for avoiding information for the uncommitted transaction changes, and the end time field of a row in the non-recent data is not assigned upon determining the key is not in the first start time index, bitmap indexes are used to mark deleted rows, and the first start time index maps the key to the start time field of a row for the first appearance of the key.

15. The computer program product of claim 14, further comprising program instructions executable by the processor to cause the processor to:
  retire, by the processor, rows from affected current files;
  output, by the processor, a history file per partition key;
  generate, by the processor, a new bit map for each affected current file, wherein the new bit map includes marking for the retired rows;
  initialize, by the processor, a first known start time index;
  create, by the processor, a current file and a history file for each partition key group for a partition key;
  group, by the processor, all rows in a partition key group by primary key;
  for each primary key group:
    sort, by the processor, rows by value in a begin time field of a row;
    write, by the processor, of a first row into the first known start time index;
    for all rows except for a last row:
      write, by the processor, values to a history file, wherein end time is assigned as $row_i.EndTime=row_{i+1}.BeginTime$, where i is an integer indicating position of a row in a sorted order of a primary key group; and
      write, by the processor, the last row to the current file.

16. An apparatus comprising:
  a memory configured to store instructions; and
  a processor configured to execute the instructions to:
    perform a process that analyzes transactional operations by maintaining the transactional operations in transaction local side logs, and waiting until a successful transaction commit to append the transaction local side logs to a log stream, the processing thread processes the transactional operations on a key used to determine whether existing data is found for the key, wherein the transactional operations are sped up through parallelism based on partitioning tables across nodes handling the transactional operations;
    perform a first process that processes updates for values of a key based on updating a first start time table index using unique keys and a start time field of a row for a first appearance of each unique key from the transactional operations; and
    perform a second process that performs a deferred update by patching up of prior versions of the key for non-recent data upon determining that recent data in the transactional operations is found for the key, wherein the nodes handling the transactional operations are based upon a subset of a primary key.

17. The apparatus of claim 16, wherein the transactional operations are performed in a multi-master distributed computing system.

18. The apparatus of claim 17, wherein:
  the process avoids information for uncommitted transaction changes;
  the process that analyzes transactional operations is a grooming process;
  the transactional operations comprise update, delete and insert operations;
  insert operations for new keys are handled as updates that specify values for a first version of a new key;
  delete operations are handled as updates that change a value of the key to an indicator that indicates deletion;
  the first start time index is a global in-memory index; and
  a table shard is assigned to the nodes handling the transactional operations.

19. The apparatus of claim 18, wherein:
  performing the deferred update comprises:
    adding the first start time index using the unique keys and the start time field of the first appearance of each unique key from the transactional operations; and
    looking up the first start time index for an unknown value of an end time field of rows in the non-recent data;
  the end time field of a row in the non-recent data is not assigned upon determining the key is not in the first start time index;
  the grooming process is limited to reading the log stream for avoiding information for the uncommitted transaction changes;
  the end time field of a row in the non-recent data is not assigned upon determining the key is not in the first start time index;
  bitmap indexes are used to mark deleted rows; and
  the first start time index maps the key to the start time field of a row for the first appearance of the key.

20. The apparatus of claim 19, wherein the processor is further configured to execute the instructions to:
  retire rows from affected current files;
  output a history file per partition key;
  generate a new bit map for each affected current file, wherein the new bit map includes marking for the retired rows;
  initialize a first known start time index;
  create a current file and a history file for each partition key group for a partition key;
  group all rows in a partition key group by primary key;
  for each primary key group:
    sort rows by value in a begin time field of a row;
    write of a first row into the first known start time index;
    for all rows except for a last row:
      write values to a history file, wherein end time is assigned as $row_i.EndTime=row_{i+1}.BeginTime$, where i is an integer indicating position of a row in a sorted order of a primary key group; and
      write the last row to the current file.

\* \* \* \* \*